United States Patent [19]
Sand

[11] Patent Number: 5,459,780
[45] Date of Patent: Oct. 17, 1995

[54] WORK AT HOME AGENT ACD CALL DISTRIBUTION

[75] Inventor: Paul R. Sand, Woodridge, Ill.

[73] Assignee: AT&T IPM Corp., Coral Gables, Fla.

[21] Appl. No.: 189,477

[22] Filed: Jan. 31, 1994

[51] Int. Cl.$^6$ .................................................. H04M 7/00
[52] U.S. Cl. ........................ 379/265; 379/210; 379/308; 379/309; 379/220
[58] Field of Search .................................. 379/265, 266, 379/210, 211, 212, 214, 201, 309, 308, 220, 207

[56] References Cited

U.S. PATENT DOCUMENTS

| | | | |
|---|---|---|---|
| 4,284,852 | 8/1981 | Szybicki et al. | 179/18 EA |
| 4,400,587 | 8/1983 | Taylor et al. | 179/27 D |
| 4,682,354 | 7/1987 | Vanacore | 379/211 |
| 4,737,983 | 4/1988 | Frauenthal | 379/221 |
| 5,036,535 | 7/1991 | Gechter et al. | 379/210 |
| 5,073,890 | 12/1991 | Danielsen | 370/58.2 |
| 5,168,515 | 12/1992 | Gechter et al. | 379/265 |
| 5,249,221 | 9/1993 | Ketring | 379/265 |
| 5,249,223 | 9/1993 | Vanacore | 379/221 |
| 5,253,288 | 10/1993 | Frey et al. | 379/210 |
| 5,291,551 | 3/1994 | Conn et al. | 379/210 |

OTHER PUBLICATIONS

H. T. Chen et al. 7,998,318 Mar. 1995.

*Primary Examiner*—Ahmad Matar
*Attorney, Agent, or Firm*—Werner Ulrich

[57] ABSTRACT

An arrangement for providing Automatic Call Distribution (ACD) service from a mixture of local and remote agents. The remote agents are connected via a voice connection to the home switch of the ACD and voice data connection to a Home Agent Server (HAS). The HAS passes call event data to a Management Information System (MIS) of the ACD, which informs the ACD switch of call events that make a remote agent available or unavailable, and passes applications data to a host processor for serving the applications of the ACD. Call set-up time is reduced by establishing longer term connections between the ACD and the remote server and using these connections for a plurality of calls; such connections are established or disconnected when the traffic level suggests the desirability of having more or fewer remote servers. Advantageously, ACD service can be provided efficiently and economically from a remote server.

9 Claims, 8 Drawing Sheets

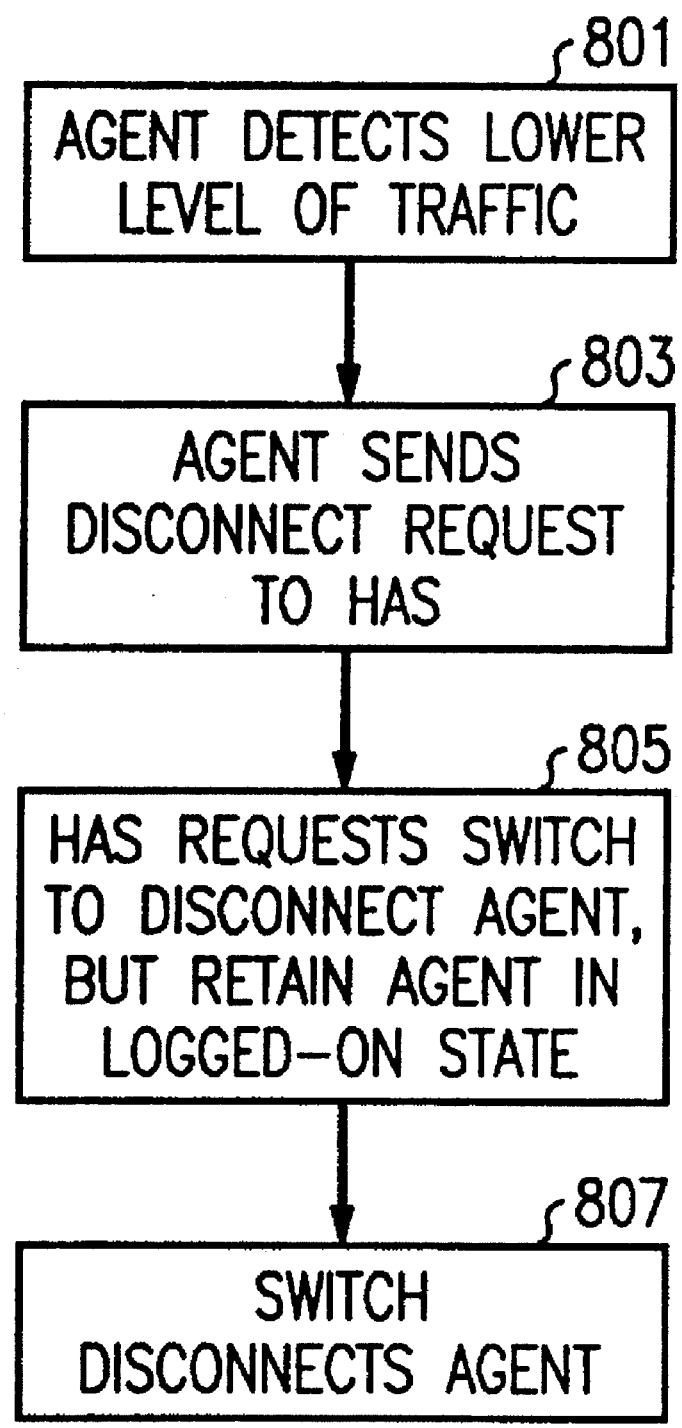

5,459,780

WORK AT HOME AGENT ACD CALL DISTRIBUTION

CROSS-REFERENCE TO RELATED APPLICATION

This application is related to the application of Mary Rita Otto entitled "*Work At Home ACD Agent Network*", filed Apr. 30, 1993, Ser. No. 08/056,232, which application is assigned to the assignee of the present application (now U.S. Pat. No. 5,392,345)

TECHNICAL FIELD

This invention relates to arrangements for allowing physically separated agents to work as a member of an automatic call distributor (ACD) team.

PROBLEM

The revolution in telecommunications is starting to make it possible to realize an old dream, that of being able to work as effectively from a home as from an office. Many people, especially those in the computer industry, are able to complete a large part of their work from work stations or personal computers in their homes. So far, however, such applications as permitting telephone agents to work from their homes have not achieved wide acceptance. Generally, it has been difficult to maintain adequate surveillance of such agents and the cost of providing telecommunications access to such agents has been sufficiently high to discourage the practice. Accordingly, a problem of the prior art is that no sound economical way has been found for allowing telephone agents that are a part of an automatic call distributor team to be physically separated from the other members of the team.

Solutions to this problem include a number of proposals, described in U.S. Pat. Nos. 5,073,890, 5,062,103, and 5,036,535, requiring the use of Integrated Services Digital Network (ISDN) facilities. Such facilities are expensive and only selectively available in the public switched telephone network.

The problem has also been partly solved and an advance made over the prior art in accordance with the principles of M. R. Otto: "*Work At Home ACD Agent Network*", filed Apr. 30, 1993, Ser. No. 08/056,232, assigned to the assignee of this application (now U.S. Pat. No. 5,392,345), wherein a work at home agent selected to serve a call by an ACD control system is connected to the caller on an audio connection, and is connected to a home agent server (HAS) unit via a data connection. The HAS unit distributes work at home agent status changes to a management information system for maintaining surveillance of the agent, and to the ACD control system so that the availability of the agent to serve a new call can be noted by the ACD control system, and transmits application data from and to a host computer for providing and accepting applications data to and from the work at home agent. Advantageously, this arrangement offers an inexpensive way of providing an audio connection to the work at home agent (the connection is maintained only for the duration of the calls to the agent), and offers the agent a single data path to obtain and accept applications data and to provide data for updating the management information system and the agent availability information for the ACD. However, this solution still has the disadvantage that the total call set-up time is longer for work at home agents.

SOLUTION

The problem in the prior art is solved, and an advance is made in accordance with applicant's invention which comprises maintaining the audio path between the work at home agent and the switch receiving calls for the ACD over a plurality of calls. Advantageously, this arrangement reduces call set-up time and switch resource utilization whenever an ACD receives enough traffic to justify retention of the audio path.

In accordance with one aspect of the invention, the system can establish or tear down audio paths to a work at home agent independent of any particular call. In one preferred embodiment, the system periodically analyzes the traffic level, number of directly connected agents, and number of work at home agents to determine whether the number of work at home agents is correct. If not, paths are established to additional work at home agents or one or more work at home agents are disconnected at the end of whatever call, if any, they are currently serving. Advantageously, such an arrangement allows call set-up time to be minimized, even when work at home agent is initially seized for serving a call, and the holding time of the path is reduced because the path is disconnected when traffic is low. In accordance with another aspect of the invention, a work at home agent can initiate a disconnect when the agent notices that the level of traffic is sufficiently low. Advantageously, such an arrangement allows a certain amount of self selection for agents who do not yet wish to log off but who would like to have a few minutes to perform other work or to relax. Advantageously, this arrangement does not require the use of an integrated voice/data path, such as an integrated ISDN path.

BRIEF DESCRIPTION OF THE DRAWING

FIG. 8 describes actions for disconnecting a logged on agent in response to the agent request.

DETAILED DESCRIPTION

Figure 1:
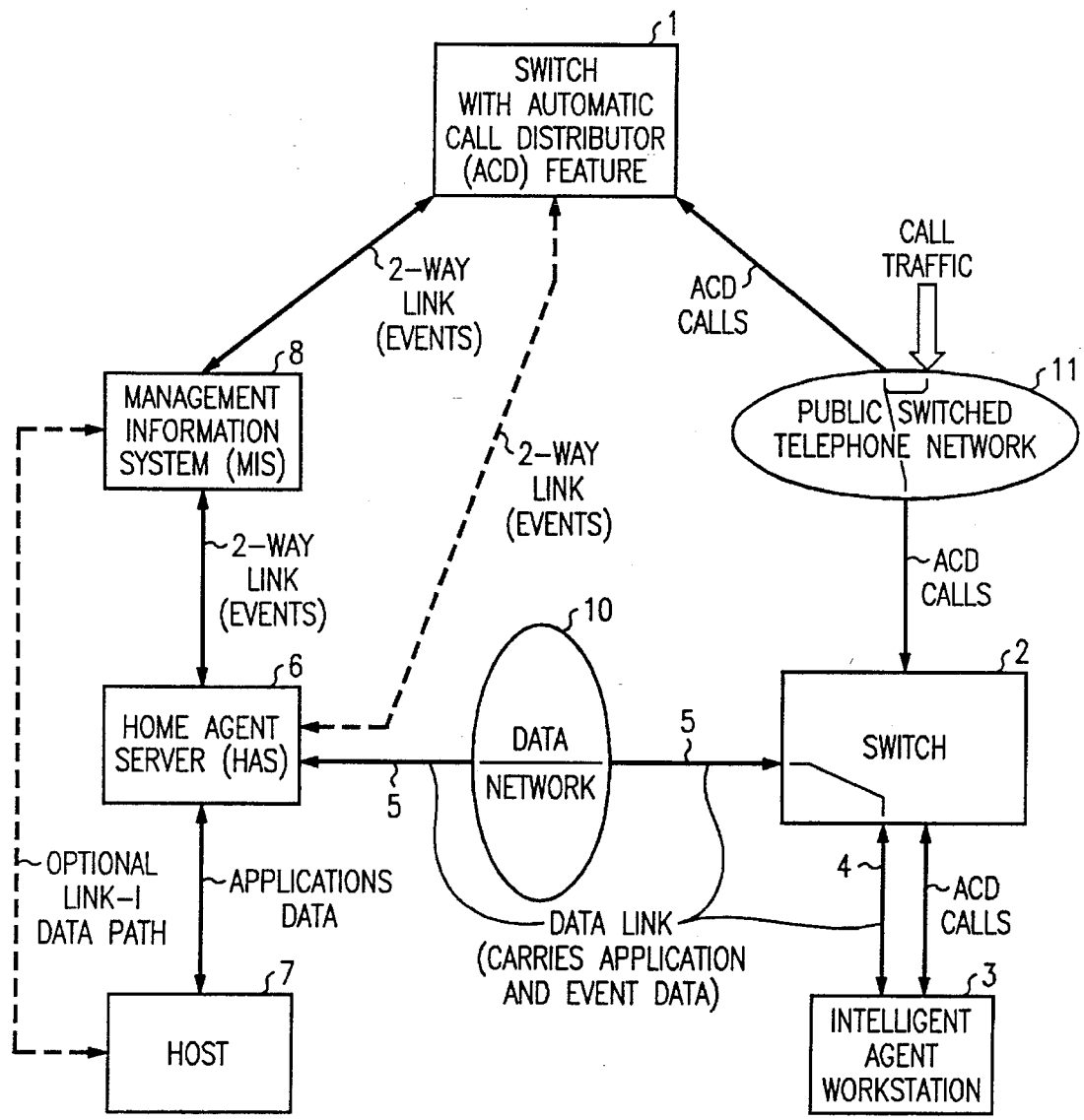
FIG. 1 is a block diagram illustrating the operation of applicant's invention.

FIG. 1 is a block diagram illustrating a system for use of applicant's invention. Incoming calls go to a switch 1 which is the host switch for the automatic call distributor (ACD) which distributes calls to the agents of the called customer. This switch typically has many agents directly connected to the switch and, in accordance with the principles of this invention, has at least one agent served by another switch. This agent is served by switch number 2. The agent has an intelligent work station 3. This intelligent work station receives voice signals from switch 2 and also transmits and receives data messages over link 4 connected to switch 2 which link is continued in data link 5 and terminates at a home agent server 6. The data link carries event messages (such as answer and disconnect) and application messages (such as data for an order placed by the caller). The home agent server (HAS) 6 transmits the applications data to a host processor 7, for example, for accepting order data, and communicates via the management information system 8 to the switch 1. Alternatively, a direct link may exist between HAS 6 and switch 1.

The management information system (MIS) is used by the supervisors of the ACD to keep track of the individual work performance of the agents of the ACD and to maintain such additional data as the number of calls that are not answered and the distribution of the waiting time before calls are answered..

The switch 1 controls the functions normally performed by an ACD including queuing calls and assigning calls to particular agents, including in this case the remote agent at intelligent agent work station 3 being served by switch 2. A particular agent work station is seized in response to receipt of a call from switch 1, but the agent is made available for the next call on the basis of event data received from the HAS 6.

Switches 1 and 2 are connected by the public switch telephone network 11 and switch 2 is connected to home agent server by any available data network 10, such as a network accessed by dial-up arrangements, such as Compunet® or Telenet®.

FIGS. 3, 4, 7 and 8 illustrate specific aspects of the method of applicant's invention.

Figure 2:
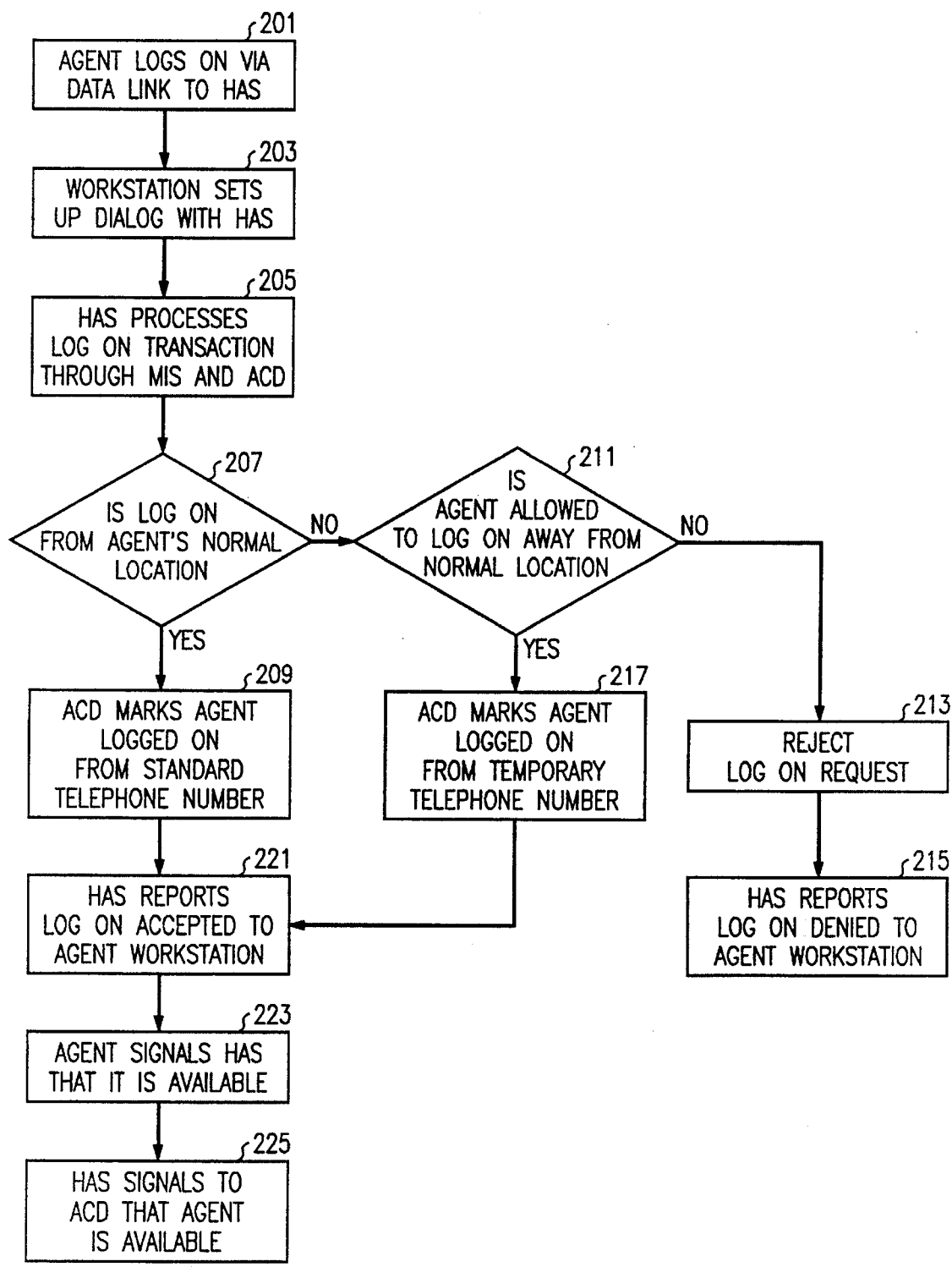
FIG. 2 is a flow diagram describing the agent login process.

FIG. 2 is a flow diagram of the process of logging in from a remote agent work station 3. The agent logs on via the data link to the home agent server (HAS) 6 (action block 201). The work station sets up a dialog with the HAS (action block 203). The HAS processes the login transaction through MIS 8 and the ACD feature of switch 1 (action block 205). In test 207 it is determined whether the call is from the agent's normal location. If so, the ACD marks the agent logged in on the standard telephone number (action block 209). If the login is not from the agent's normal location (negative result of test 207) then test 211 is used to determine if the agent is allowed to log in away from that agent's normal location. If not, then the login request is rejected (action block 213) and the HAS reports the login denied to the agent work station (action block 215). If the agent is allowed to log in away from the normal location (positive result of test 211), then the ACD marks the agent logged in and records the temporary telephone number for that agent (action block 217). Following the execution of either action block 209 or 217, the HAS reports login accepted to the agent work station (action block 221). When the agent is ready, the agent then signals the HAS that it is available (action block 223). The HAS then signals the ACD that the agent is available (action block 225) and the agent is marked as being available for calls by the ACD.

Figure 3:
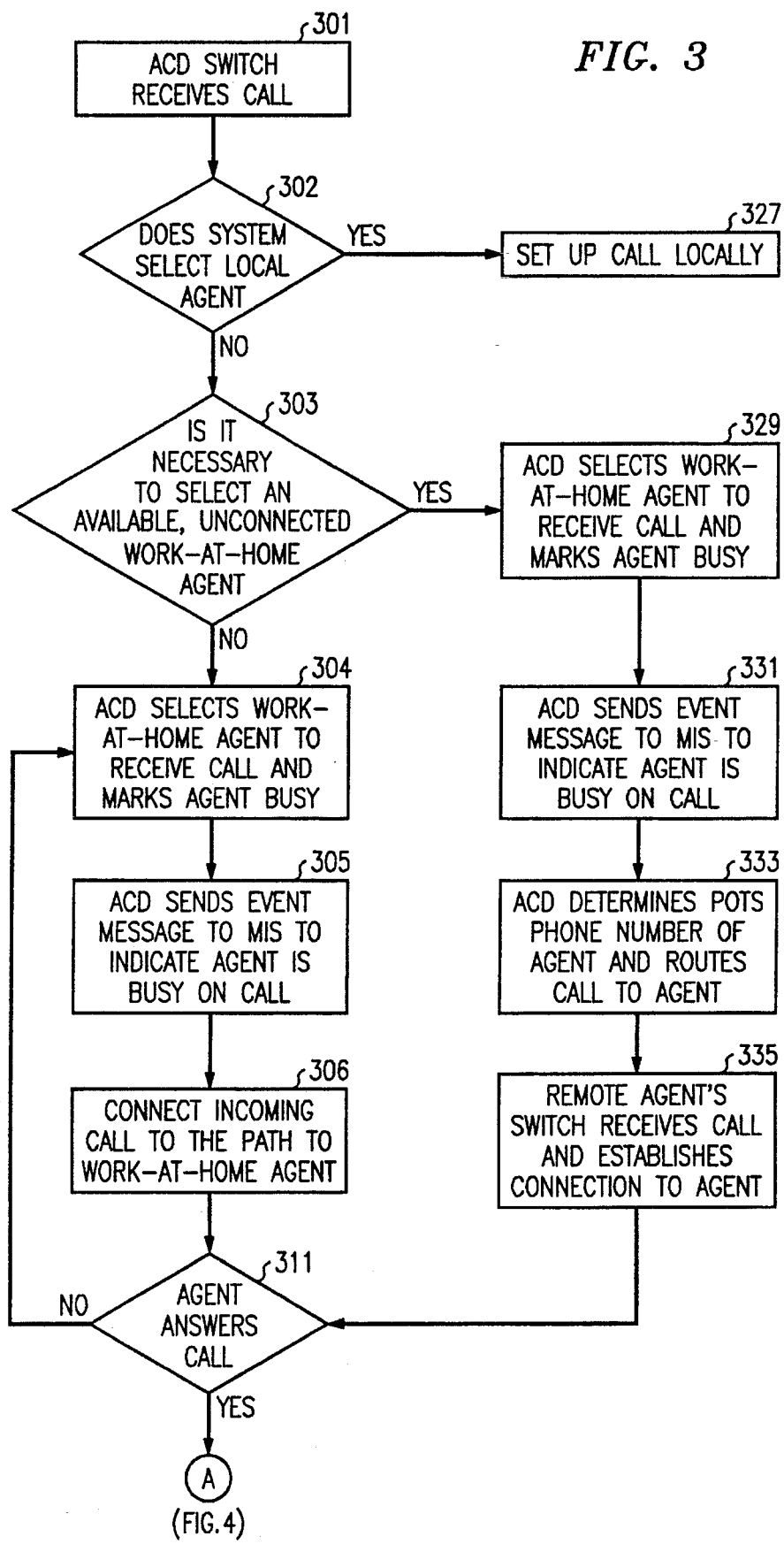
FIGS. 3 and 4 describe the operation of handling a call received by the ACD switch.
Figure 4:
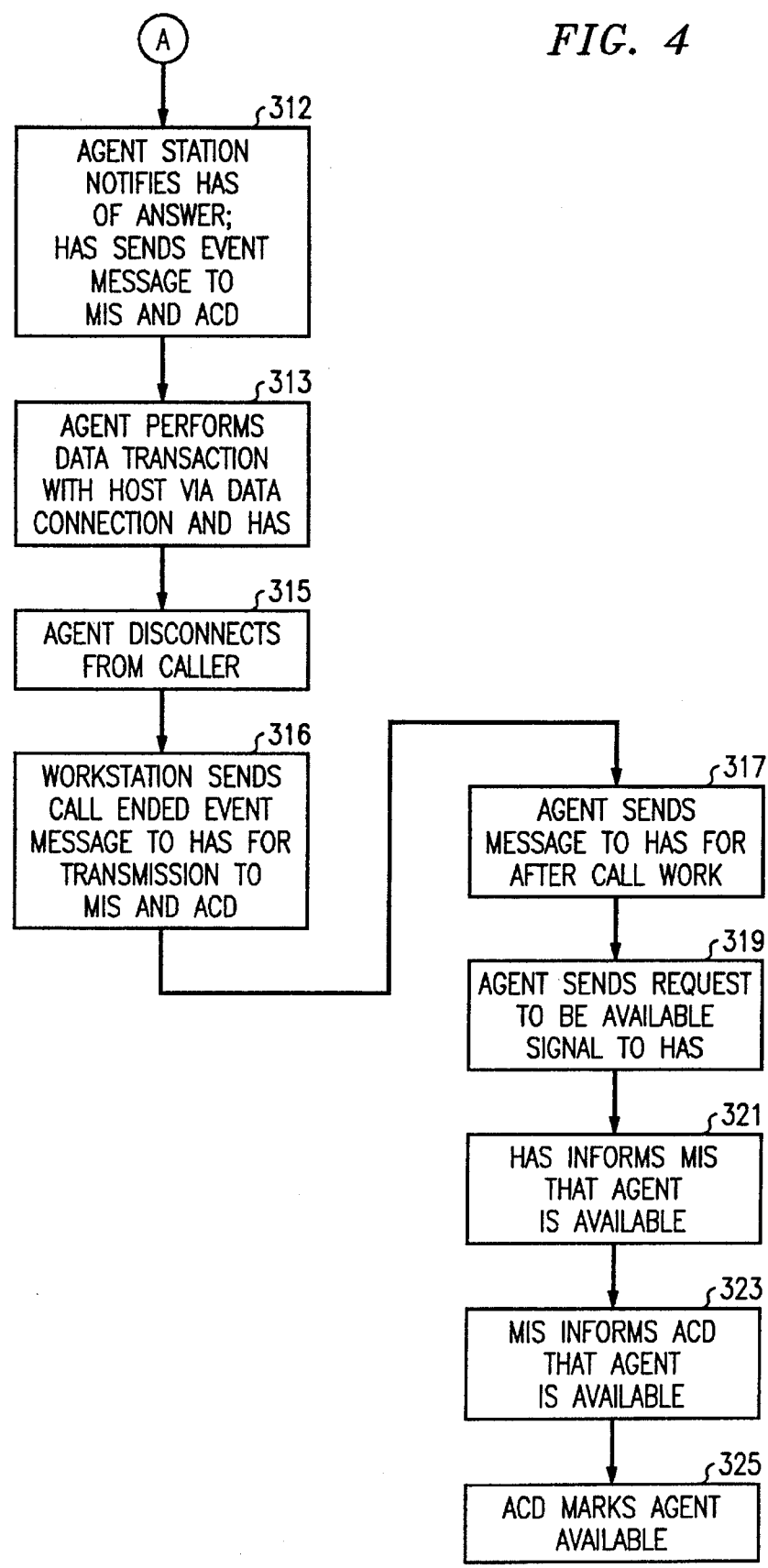

FIGS. 3 and 4 are flow diagrams illustrating the processing of a call that is routed to the remote agent. The ACD switch receives a call for an agent of that ACD (action block 301). The call may be a new call or a call stored in a queue of the ACD. The ACD system performs a test 302 to decide whether a local agent (in contrast to a work at home agent) is to be used for processing that call. If not, the system performs test 303 to determine whether it is necessary to select an unconnected available work at home agent. If not, the ACD selects a connected work at home agent to receive the call (because it is the turn of that agent to process the call) and marks that agent busy (action block 304). The ACD sends an event message to MIS 8 to indicate that the agent is busy on a call (action block 305). The agent connects the incoming call to the path between the ACD switch (in this case switch 1) and the work at home agent (action block 306). In this case, the part of the path from switch 1 to the work at home agent has already been established. If (negative result of test 311) the agent does not answer the call, block 304 is reentered to try another agent. If the agent answers the call (positive result of test 311), the agent station provides an event message to the HAS which informs the MIS 8 and switch 1 of the agent answer (action block 312). The agent then talks to the caller and performs data transactions with the host processor 7 via the data connection and the HAS (action block 313). Eventually, the agent disconnects from the caller (or vice versa) (action block 315). The work station sends a call ended event message to the HAS and the HAS informs the MIS and the switch of this event (action block 3 16). The agent then continues to send messages to the HAS for after-call work (action block 3 17). This after-call work is in the form of communications with host processor 7. Eventually, the agent sends a request to be made available signal to the HAS (action block 319) and the HAS informs the MIS that the agent is now available (action block 321). The MIS then informs the ACD that the agent is available (action block 323) and the ACD feature of switch 1 marks the agent available for another call (action block 325). If the test 302 determines that the system has selected a local agent, the call is simply set up locally in accordance with the principles of the prior art (action block 327). If the result of test 302 is that the system has selected an unconnected available work at home agent, then the ACD selects that work at home agent to receive that call and marks that agent busy (action block 329). The ACD sends an event message to the management information system to indicate that the agent who is still unconnected is busy on a call (action block 331). The ACD determines the POTS (plain old telephone service) telephone number of the selected agent and controls establishment of a connection of the call to that agent (action block 333). The work at home agent's switch receives the call and establishes the connection to the agent (action block 335). Thereafter, the actions starting with test 311, previously described, are performed..

Figure 5:
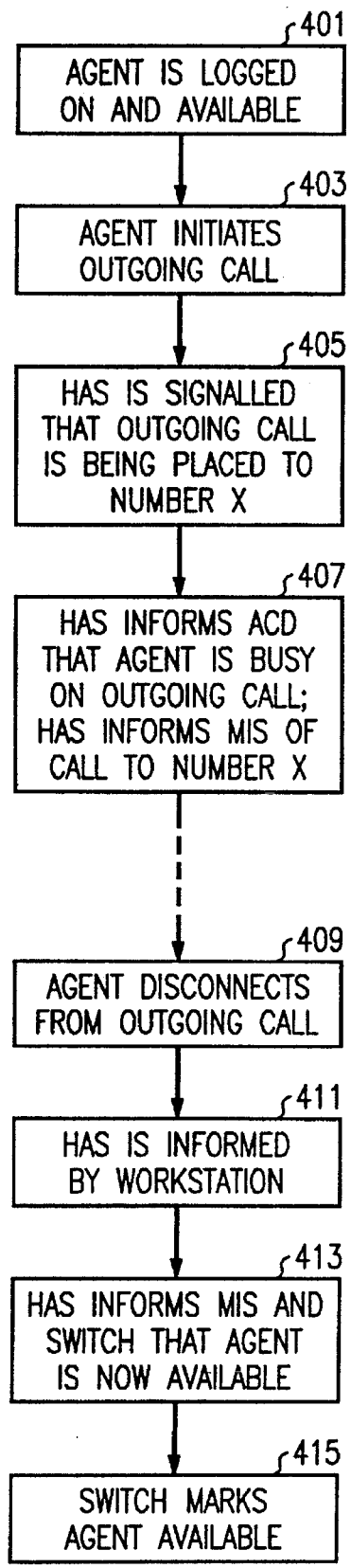
FIG. 5 describes the actions taken by a logged on agent when making an outgoing call.

FIG. 5 illustrates the actions performed when the agent makes an outgoing call without logging off. During this time the agent is not available for receiving incoming calls. In the initial state, the agent is logged in and available (action block 401). The agent then initiates an outgoing call (action block 403). The HAS is signaled that an outgoing call is being placed to number X (action block 405). The HAS informs the ACD that the agent is busy on an outgoing call and the HAS informs the MIS of a call to number X (action block 407). Some time later, the agent disconnects from the outgoing call (action block 409) and the HAS is informed by the work station of the disconnect (action block 411). The HAS informs the MIS and switch 1 that the agent is not available (action block 413) and switch 1 marks the agent available to process new calls (action block 415). The system will then make that agent available as a candidate for establishing a connection either as described above with respect to action blocks 329–335 of FIGS. 3 and 4 or, as discussed further hereinafter, with respect to FIG. 7.

Many agents have their own telephone numbers by which they may be reached directly on incoming calls. If someone calls the telephone number of an idle remote agent, the call can be accepted and the HAS informed. The HAS informs the MIS for record purposes, which informs the switch to make the agent busy. When that call is disconnected, the HAS is informed, and the HAS informs the MIS; the MIS records the disconnect and informs the switch, which makes the agent available for ACD calls. The agent can also have call waiting for outside (non-ACD calls) on hold. The HAS is informed of these events and informs the MIS which makes a record. The agent status remains busy in the ACD switch in these cases. The system will then make that agent available as a candidate for establishing a connection either as described above with respect to action blocks 329–335 of FIGS. 3 and 4 or, as discussed further hereinafter, with respect to FIG. 7.

Figure 6:
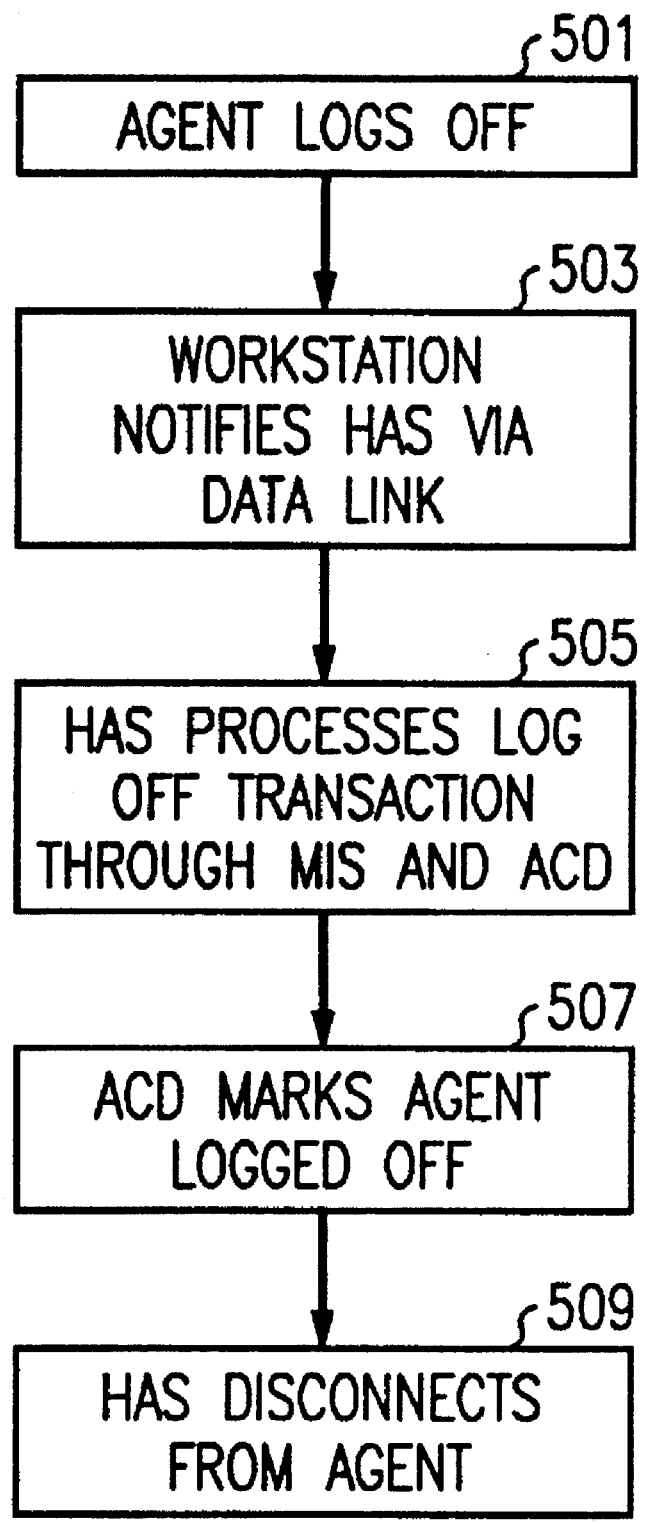
FIG. 6 describes the actions taken in response to a log off by the remote agent.

FIG. 6 illustrates the process of logging off. The agent initiates the logoff (action block 501). The work station notifies the HAS via the data link of the logoff request (action block 503). The HAS processes logoff transaction through the MIS and ACD (action block 505). The ACD marks the agent logged off, disconnecting the audio connection to the agent, if required (action block 507), and the HAS disconnects its data link from the agent (action block 509).

Figure 7:
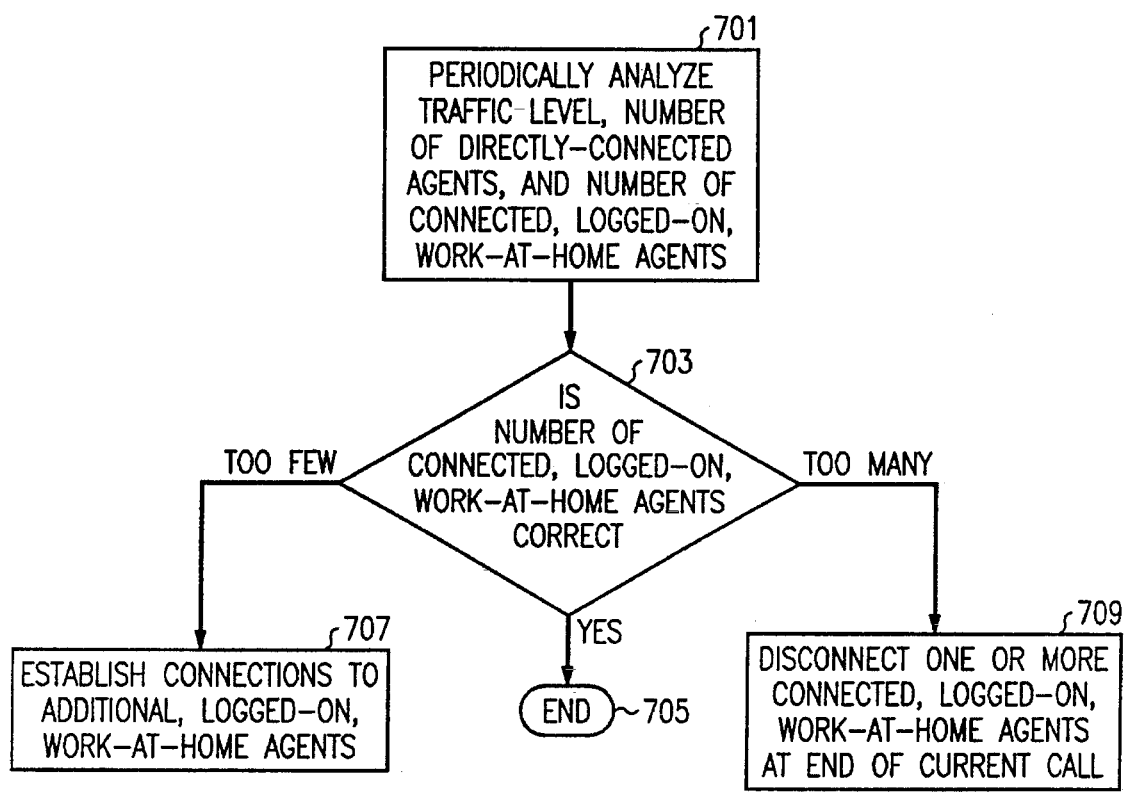
FIG. 7 describes actions to add or subtract connections to logged on work at home agents.

FIG. 7 describes the process for connecting or disconnecting an audio path between the switching system supporting the ACD (system 1 in the preferred embodiment) and the work at home agent. Periodically the traffic level to the ACD is analyzed and compared with a number of logged in directly connected agents (i.e., agents directly connected to the ACD switching system) and the number of logged in connected work at home agents (action block 701). Test 703 determines whether the number of logged-in connected work at home agents is correct. If so, this is the end of that periodic analysis (action block 705). If it is determined that there are too few logged-in connected work at home agents, then connections are established to additional logged-in work at home agents (action block 707). These connections are established over the public switched telephone network using the POTS (plain old telephone service) telephone number of the individual work at home agent. If it is established in test 703 that too many logged-in work at home agents are currently connected in view of present traffic levels, then one or more of the logged-in work at home agents are disconnected from the ACD switching system at the end of the call, if any, which they are currently serving (action block 709).

FIG. 8 illustrates an agent initiated disconnect for a logged-in connected work at home agent. The agent detects a lowered level of traffic (action block 801). This can be in response to a request for data from the HAS. (If the agent decides to request a disconnect, the agent sends such a disconnect request to the HAS (action block 803). The HAS requests the switch to disconnect the agent but retain the agent in the log-on state (action block 805). The switch then disconnects the agent (action block 807). The procedure of FIG. 8 is used if an agent wishes to have a brief respite from receiving calls. It is not a substitute for the log-off procedure previously described with respect to FIG. 6. If an intelligent agent work station is used, this work station can be programmed to make the tests for a decision to disconnect automatically.

While in this detailed description, the use of an HAS is assumed., other ACD control arrangements in which the control of work at home agents is more fully integrated are also possible, as long as the connection between the ACD control switch and the work at home agent station is retained for several calls. Other options include disconnecting if no more calls are available for the work at home agent and reconnecting as soon as that agent is selected for another call. The major advantage, realizable to a greater or lesser extent depending on which option is used, is the reduced average call set-up time and the lower use of connection set-up resources, possibly at the expense of a longer total holding time for the connection to the work at home agent.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A method of providing automatic call distribution (ACD) service, for incoming calls received at an ACD system, from an agent station not served by a switch for serving said ACD system, comprising:

responsive to receipt of a call by said ACD system, establishing an audio connection from said incoming ACD call to said agent station for serving said call via a public switched telephone network, said audio connection comprising an audio path via said public switched telephone network for connecting said ACD system to said agent station, wherein said audio path is not part of an integrated voice/data path; and following a disconnect of said call, retaining said audio path for use in serving a subsequent call, to said ACD system, by said agent station.

2. A method of providing automatic call distribution (ACD) service for incoming calls received at an ACD system, from an agent station not served by a switch for serving said ACD system, comprising:

responsive to a need detected in said ACD system, establishing an audio path between said ACD system and an agent station of said ACD served by a different switching system, said audio path being established via a public switched telephone network, wherein said audio path is not part of an integrated voice/data path;

establishing a subsequent connection for a call to said ACD system, to be served from said agent station, by connecting said call to said audio path; and upon disconnecting said call, retaining said audio path for use in serving a subsequent call, to said ACD system, by said agent station.

3. The method of claim 2 further comprising the step of:

responsive to a path disconnection request from said agent station, disconnecting said path.

4. The method of claim 3 wherein said agent station is programmed to selectively automatically generate said disconnection request.

5. The method of claim 2 further comprising:

responsive to a decrease of a number of simultaneous calls to said ACD, disconnecting said path.

6. The method of claim 2 wherein said path is established in response to an increase of a number of simultaneous calls to said ACD.

7. The method of claim 2 wherein said path is established in response to a decrease in the number of agent stations logged on to said ACD system.

8. The method of claim 2 wherein said agent station communicates control information over a data link to a home agent server for informing said ACD system of an availability status of said agent station.

9. The method of claim 2, further comprising the step of:

prior to establishing said audio path, receiving a log on request from said agent station.

* * * * *